Figure 1:
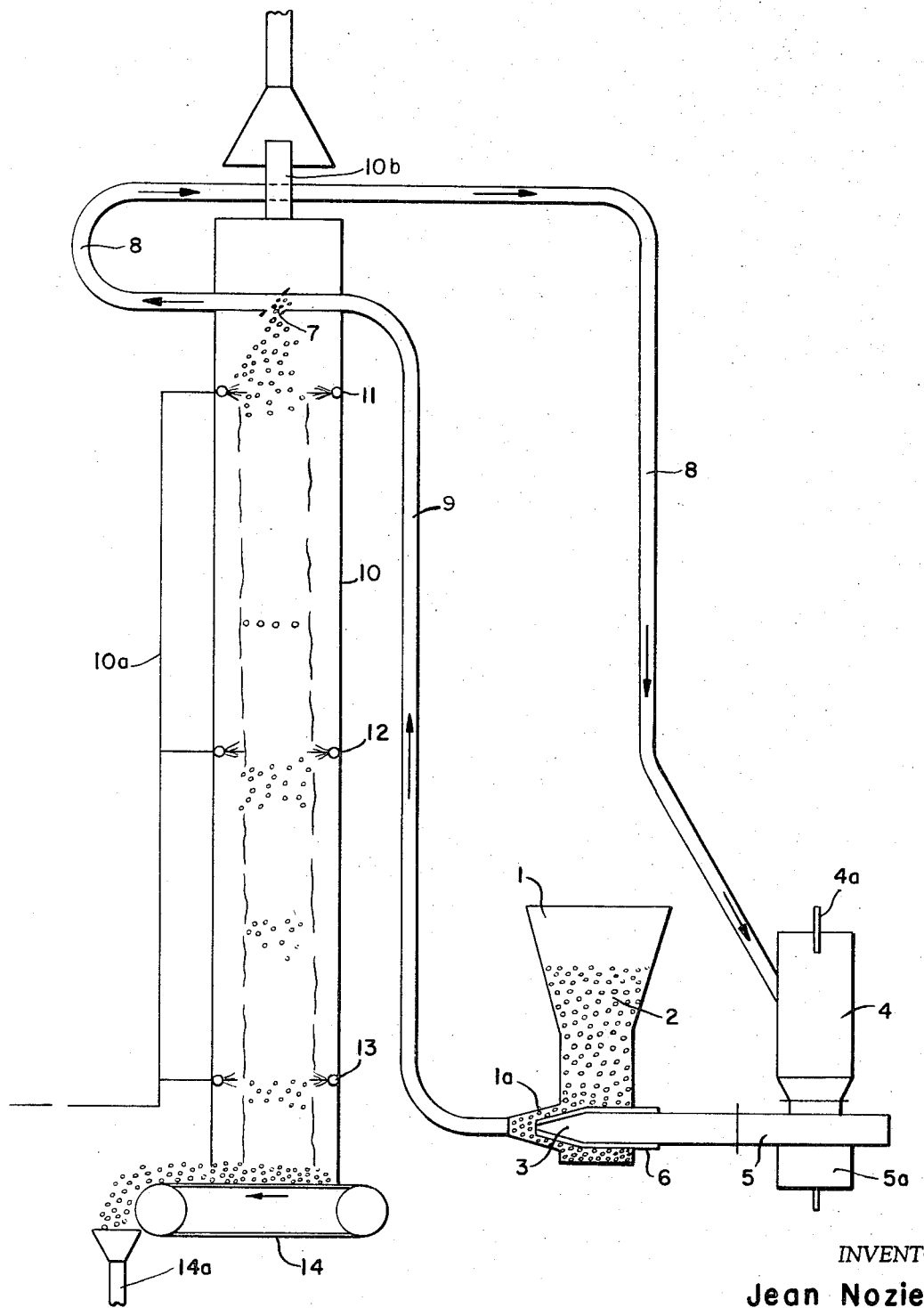

United States Patent [19]
Noziere

[11] 3,832,430
[45] Aug. 27, 1974

[54] METHOD FOR THE EXPRESSION OF EXPANDABLE GRANULES OF THERMOPLASTIC MATERIALS IN PARTICULAR POLYSTYRENE

[75] Inventor: Jean Noziere, Clermont, Oise, France

[73] Assignee: Saint Gobain Industries, Neuilly sur Seine, France

[22] Filed: Dec. 11, 1968

[21] Appl. No.: 783,038

[30] Foreign Application Priority Data
Dec. 12, 1967 France .......................... 67.131851

[52] U.S. Cl. ............. 264/51, 264/345, 264/DIG. 9, 432/13, 432/58, 432/103
[51] Int. Cl. ........................................... B29d 27/00
[58] Field of Search ............ 264/51, 53, 55, DIG. 9, 264/345; 263/21 B; 432/13, 58, 103

[56] References Cited
UNITED STATES PATENTS

| | | | |
|---|---|---|---|
| 2,543,987 | 3/1951 | Ramsey | 264/43 X |
| 2,642,273 | 6/1953 | Dube | 263/21 B X |
| 3,046,607 | 7/1962 | Blaha | 264/43 X |
| 3,252,228 | 5/1966 | Ehrenfreund | 264/53 X |
| 3,262,686 | 7/1966 | Kraus | 264/53 |
| 3,347,961 | 10/1967 | Russell | 264/53 |

FOREIGN PATENTS OR APPLICATIONS

| | | | |
|---|---|---|---|
| 595,166 | 3/1960 | Canada | 264/51 |
| 688,154 | 6/1964 | Canada | 264/51 |
| 1,134,504 | 8/1962 | Germany | 264/51 |
| 706,305 | 3/1965 | Canada | 264/53 |

OTHER PUBLICATIONS

Muller; G., "Processing Techniques and Equipment for the Preparation of Blocks and Moulding of Styropor Foam," Kunststoffe, Vol. 55, May 1965, pp. 18–20, pp. 379–382.

*Primary Examiner*—Philip E. Anderson
*Attorney, Agent, or Firm*—Synnestvedt & Lechner

[57] ABSTRACT

Method for the expansion of granules of thermoplastic material, particularly polystyrene. The discrete granules are fed into the upper end of a tower or drum and allowed to descend by gravity while under agitation. While so descending they are insufflated with jets of saturated or superheated steam which surrounds each granule and causes it to expand to a final density as low as 4 kg/m³. The granules may be preheated before insufflation with steam, as by entraining them in a stream of heated air which also deposits them into the top of a tower. Or they may be preheated by moving them in a layer between confronting runs of upper and lower foraminous conveyor belts while directing heated air through the layer. When an inclined drum is used the discrete granules are introduced into the elevated end of the rotating drum and agitated while being insufflated with steam dispersed into the drum in a large number of jets distributed in and along its axis of rotation.

7 Claims, 3 Drawing Figures

FIG. I.

INVENTOR
Jean Noziere
BY Bauer & Seymour
ATTORNEYS

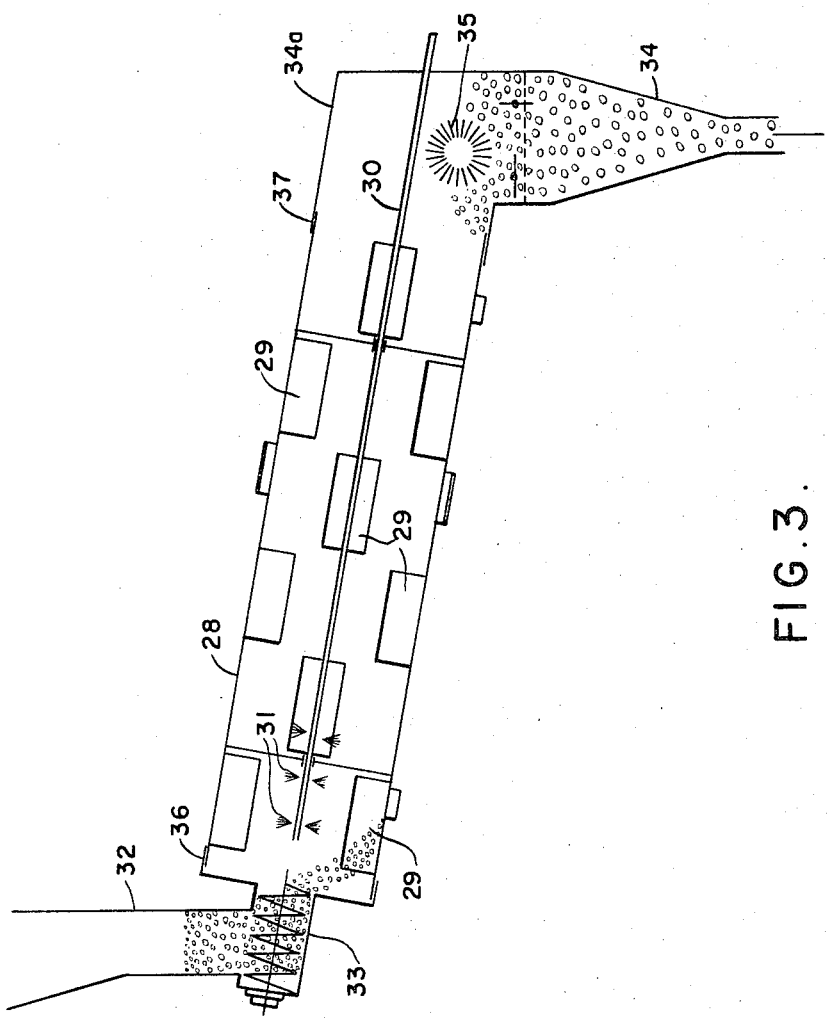

METHOD FOR THE EXPRESSION OF EXPANDABLE GRANULES OF THERMOPLASTIC MATERIALS IN PARTICULAR POLYSTYRENE

This invention relates to a method for the production of cellular thermoplastic material of low density, and which is useful to form blocks, sheets or other shapes. The starting material is in general in the form of granules, small cylinders, or spheres, containing a blowing agent. While the invention will be described with particular referecne to polystyrene, it is equally useful in connection with the expansion of polysulfones or other organic thermoplastics generally non-combustible or combustible only with difficulty.

The expansion of the granules transforms them into beads or pearls. This expansion is brought about by heat applied, for example, by contacting the granules with a fluid such as steam. In a known procedure, after the aforesaid treatment with heated fluid, the granules thus obtained are subjected to heated air or steam which may advantageously be superheated.

The pre-expansion of the granules into pearls is usually carried out in an apparatus comprising a foraminous conveyor belt having a horizontal run onto which the granules are deposited, and including a first section where the material is insufflated with heated air and a second or subsequent section where it is subjected to insufflation with steam. The material is thus disposed in a layer of certain thickness. The aforesaid treatment can also be carried out by a vertically-disposed apparatus wherein the pearls or beads are in contact one with the others. Since the temperature to which the beads are subjected is, in the case of polystyrene, about 115° C., they are in a softened condition and thus have a tendency to adhere together or to parts of the apparatus with which they come into contact. There is thus presented the possibility that the entire mass of granules or pearls may agglomerate into a block or lump.

It is the chief object of the present invention to provide a method which obviates the foregoing tendency of the beads to agglomerate.

A further object is to simplify and improve the aforesaid process by which the granules are expanded.

Another object is to provide a process as aforesaid wherein the heated fluids are utilized to maximum and highly efficient degree.

More specifically, it is an object of the invention to treat the granules to steam by insufflating them over the entire surface area of each, as it falls freely in and along a vertically disposed tower, or a rotating drum having its axis inclined in the direction of travel of the granules therein.

Still more specifically it is an object to provide a process wherein the granules during free fall within and along a generally vertical tower or duct are subjected to insufflation with steam during their travel. Alternatively the granules may be insufflated with steam as they move in and along a rotating drum having an inclined axis of rotation and provided with means by which the granules are repeatedly elevated and then dropped while being individually subjected to the steam.

Yet another object is to provide a process by which movement of the granules is accurately controlled during passage in and along the enclosure whrein they are insufflated and expanded.

Another object is to provide a process wherein the granules are first or preliminarily expanded or preheated by the action of heated air or steam and, in one form, wherein they are entrained by the heated air and conveyed into the enclosure where insufflation with steam occurs, for further expansion.

Figure 2:
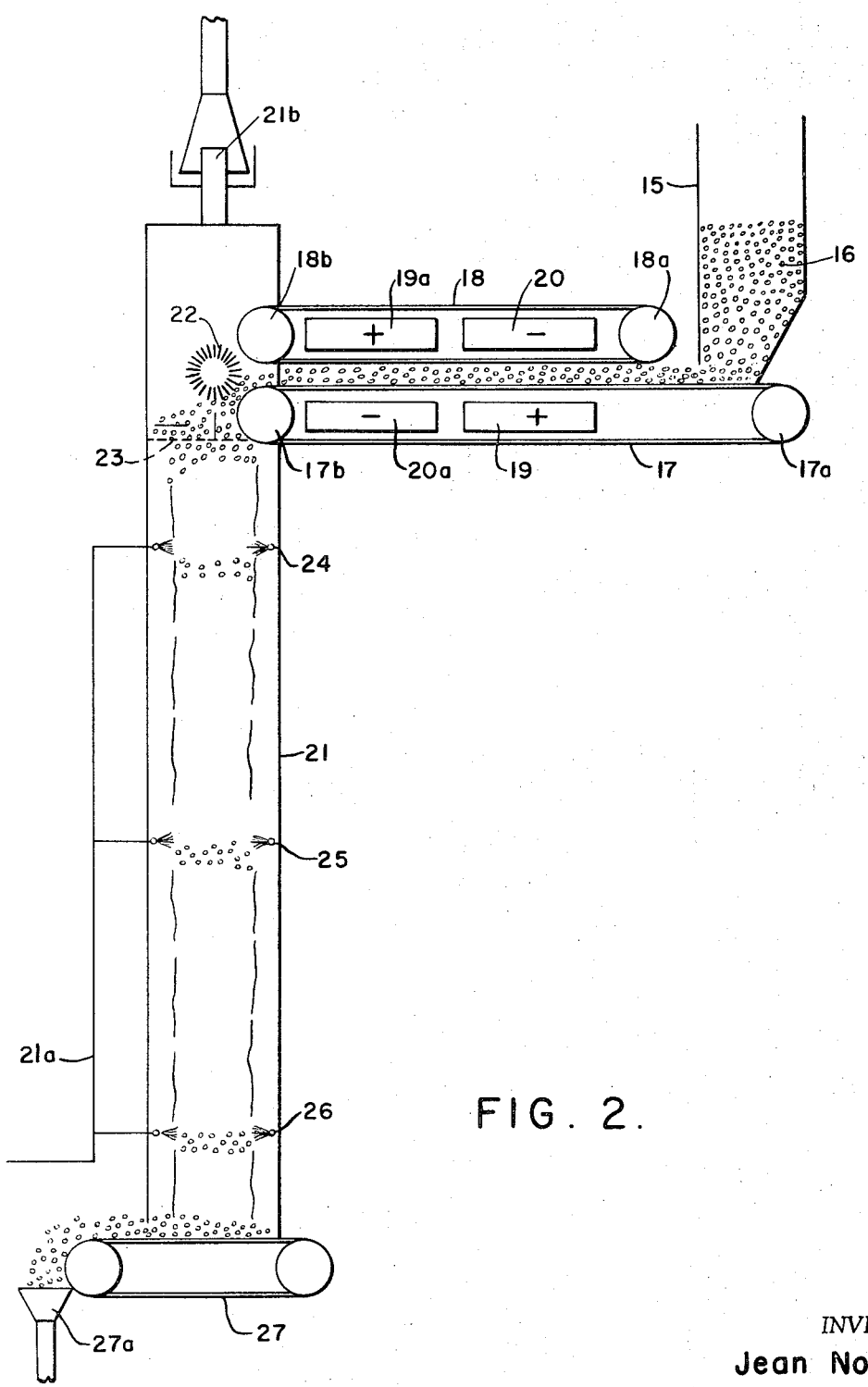

Non-limiting forms of the apparatus utilized to carry out the process are shown in the accompanying drawing wherein:

FIG. 1 is a schematic elevational view, partly in section, of a first embodiment in which the granules are introduced into an insufflating tower after they have been pre-expanded by heated air which also conveys them in and along a feed pipe or duct;

FIG. 2 is an elevational view partly in section, of a second form of the apparatus wherein granules are preheated and introduced into the insufflating and expansion tower, by conveyor belt means; and FIG. 3 is a vertical section through a third form of apparatus embodying a drum rotatable about a downwardly and forwardly inclined axis wherein the granules are insufflated and expanded with steam as they gravitate and tumble in and along the drum.

Referring in detail to FIG. 1, a hopper 1 contains granules of thermoplastic material 2 which are to be pre-expanded. The base of the hopper is equipped with a venturi opening 1a leading therefrom and equipped with a nozzle 3 connected with a source of heated air supplied by a burner 4a which may utilize gas or liquid fuel. A blower 5 draws the heated air through the heater and propels it to and out of nozzle 3. The blower is powered by a motor 5a. The nozzle is, as shown, enveloped in a heat-insulating jacket 6 within hopper 1, in order to avoid overheating of the granules 2 as they descend into contact with and about the nozzle. The jacket is supplied with coolant such as water, which is continuously fed to and through the jacket then exhausted therefrom by means not shown. Melting and agglomeration of the granules in the base of the hopper are thereby prevented.

A conveyor duct 9 has one end in communication with venturi 1a and rises to the top of a vertical tower 10. The duct then passes horizontally through the top of the tower and is therein provided with a grilled or screened opening. As the granules are entrained by the flow of heated air propelled from nozzle 3 they are carried upwardly by the air and fall through grill 7. From thence they descend by gravity in and along tower 10. Since the granules are thus individually entrained by the flow of heated air, they are maintained separate and at the same time fully and uniformly preheated. Agglomeration of the granules is thus prevented. The grill is so constructed and arranged that it intercepts the preheated granules and deflects them downwardly into the tower, while the entraining air continues in a return path through pipe or duct 8 to heater 4, as indicated by the arrows.

The preheated material falls freely in and along tower 10 wherein it is insufflated with saturated or superheated steam at several levels, for instance as indicated at 11, 12 and 13, top to bottom, and thereby fully expanded by the time of arrival at the base of the tower. The steam is supplied by a pipe 10a connected as shown with each of the annular tubes at the respective levels. The upper pass of a conveyor belt 14 obturates the lower otherwise open end of the tower. The expanded granules fall onto this pass and are carried exteriorly of the tower and deposited into chute 14a. It will be understood that at each level 11, 12, 13 there is located an annular tube pierced with a number of spaced holes which are so located that each directs a jet of steam radially inwardly. If desired, each hole, or some of them, may be so located that the emerging jet has an upward component parallel with the vertical axis of the tower so that the time of fall of the granules in and through the tower may be controlled and the rate of fall retarded. Spent steam may be exhausted from the top of the tower as indicated at 10b.

The following table gives an example of satisfactory physical values for the expansion of polystyrene granules:

| | |
|---|---|
| Temperature of air at entrance to venturi | 145° C. |
| Flow rate of air at venturi | 180 m³/hr. |
| Velocity of air in duct 9 | 7 m/sec. |
| Temperature of granules at exit from grill | 110° C. |
| Temperature in tower | 100° to 115° C. |
| Apparent density of granules at entrance to tower | 10 kg/m³ |
| Apparent density of expanded granules at exit of tower | 6 kg/m³ |

By increasing the time of insufflation with steam in the tower, or by heating the entraining air to a somewhat higher temperature, the final apparent density of the fully-expanded granules may be reduced to about 4 kg/m³.

FIG. 2 shows an apparatus embodying a hopper 15 containing granules 16 to be expanded. The granules flow by gravity from the hopper and are thereby deposited uniformly upon one end of the upper run of a foraminous conveyor belt 17 which passes about rollers 17a, 17b. The inner one of these rollers is, as shown journaled within tower 21. A second foraminous conveyor belt 18 passes about guide rollers 18a, 18b and has its lower pass superposed over and generally parallel with the upper run of belt 17. Guide roller 18b is also located mainly within tower 21. A heater housing 19 is located between the runs of belt 17 and is adapted to direct heated air upwardly. The air passes through the upper run of belt 17, those granules presently passing over this heater, and is drawn or exhausted from an exhaust housing 20 for reheating and recirculation by conduit and blower means not shown. A second heater 19a may be located downstream of heater 19 and directs heated air downwardly through the lower run of belt 18, the granules presently passing beneath and the upper run of belt 17. This air is exhausted into a chamber of housing 20a for recirculation as aforesaid. Thus as the granules pass in a layer of uniform thickness determined by the spacing between contiguous runs of belts 17, 18, they are preheated by the air which in the case of polystyrene will be about 115° C. One or both of the pairs of housings 19, 20, and 19a, 20a, may be replaced by means delivering jets of steam into and through the layer of granules passing along with and between the belts which move at the same linear speed. For example, as they pass between the locations of housings 19, 20, the granules may be subjected to insufflation with steam, preferably superheated. Then, as they pass between the locations of housings 19a, 20a they may be insufflated with a current of heated air.

As the preheated granules pass from between the confronting runs of belts 17, 18 they drop into the upper end of tower 21 and fall as in the apparatus of FIG. 1. Removal of the preheated granules from the belts is aided by a rotating power-driven brush as indicated at 22. The granules thus start their fall through the tower in an even distribution over the transverse or horizontal area of the tower.

As in the case of FIG. 1, the granules as they fall are insufflated with steam at levels indicated at 24, 25, 26, top to bottom. The steam may be saturated or superheated and emerges at each level from a respective one of three ring-like pipes each provided with a multiplicity of spaced, inwardly-directed holes, to form an equal number of radially-directed jets. Steam is supplied from a pipe 21a connected to the jet-forming rings at each of the levels 24, 25, 26.

As the expanded granules arrive at the base of the tower they fall upon the upper run of a conveyor belt 27 and, in a manner clear from the figure, pass to chute 27a. Spent steam may be exhausted from the top of the tower, as indicated at 21b and condensed for reheating and further use.

FIG. 3 shows the invention embodied in a device of the inclined rotating drum type generally indicated at 28 and rotatable about its inclined central axis by power-driven means not shown. Granules such as polystyrene are introduced into a hopper 32 and are fed by a screw feed mechanism 33 at a uniform rate into the drum, through a central opening in the stationary cap or cover enclosing the left end of the drum. The drum is provided with agitating means such as blades 29 fixed to its interior surface as shown, in staggered relation, and operable as the drum rotates to pick up the granules, elevate them nearly to the top and then allow them to drop under insufflation by steam, as they pass gradually down and along the drum.

While being thus agitated and fed along the drum the granules are insufflated with steam which is conveniently introduced by a pipe 30 extending into the drum from the right end thereof. This pipe is provided with regularly spaced radial orifices along its length within the drum and from which steam emerges in a large number of jets as indicted at 31 to thoroughly insufflate the agitated and falling granules. As these emerge from the lower or right end of the drum they pass into a fixed housing 34a provided with a chute 34. The action is assisted by a power-rotated brush or like item 35. The glands or seals between the rotating drum and hopper 32, and between housing 34a at the feed and delivery ends are identified at 36 and 37, respectively.

Means for preheating the granules before they are deposited into hopper 32 may be provided. Such means for example may take the form of FIG. 1 wherein they are entrained by heated air and thereby deposited into hopper 32, or by foraminous belts as in FIG. 2 between which they are heated and deposited into the hopper feeding the drum.

The foregoing disclosure sets forth suggested but nonlimiting examples of means by which the inventive method may be carried out. Modifications and substitutions of equivalents are possible and will readily occur to those skilled in the art, after a study of the specification.

Having fully disclosed the invention, what I claim and desire to secure by Letters Patent is:

1. The method of expanding granular, stable, low density, synthetic thermoplastic material, in particular polystyrene, comprising introducing the discrete granules into an enclosed confined space for free gravitational flow in a downward path therein, dispersing steam into said space at a plurality of vertically-spaced levels to individually insufflate and expand each granule during its passage in and along said space, and collecting the expanded granules as they emerge from said space.

2. The method of claim 1, the flow of granules being vertically downwardly in and along a tower defining said enclosed, confined space, insufflating steam being directed in a plurality of radial jets at each said level, from locations adjacent the peripheral walls of the tower.

3. The method of claim 1, and preheating the granules by entraining them in heated air, passing the heated air and entrained granules into said enclosed space, there separating the granules from the air, dispensing them into said space, and exhausting the heated air from the space.

4. The method of claim 3, and reheating and recirculating the exhausted air.

5. The method of claim 1, continuously forming the granules into a porous layer of uniform thickness, passing heated fluid through the layer to preheat the granules, and introducing the preheated granules continuously into said space.

6. The method of claim 1, said enclosed space having an axis of symmetry inclined downwardly to the vertical at less than 90° in the direction of flow of granules therethrough, and rotating the space about said inclined axis to agitate the granules while being insufflated with steam dispersed into the space in the form of a multiplicity of jets.

7. The method of claim 6, said jets being dispersed radially outwardly from and along said axis.

* * * * *